J. M. AND F. C. RUSSELL.
FLUID CLUTCH AND TRANSMISSION.
APPLICATION FILED JUNE 12, 1919.

1,388,311.

Patented Aug. 23, 1921.
3 SHEETS—SHEET 1.

WITNESS
W<sup>m</sup> F. Drew

INVENTORS
John M. Russell
Frederick C. Russell
BY Acker & Totten
ATTORNEYS

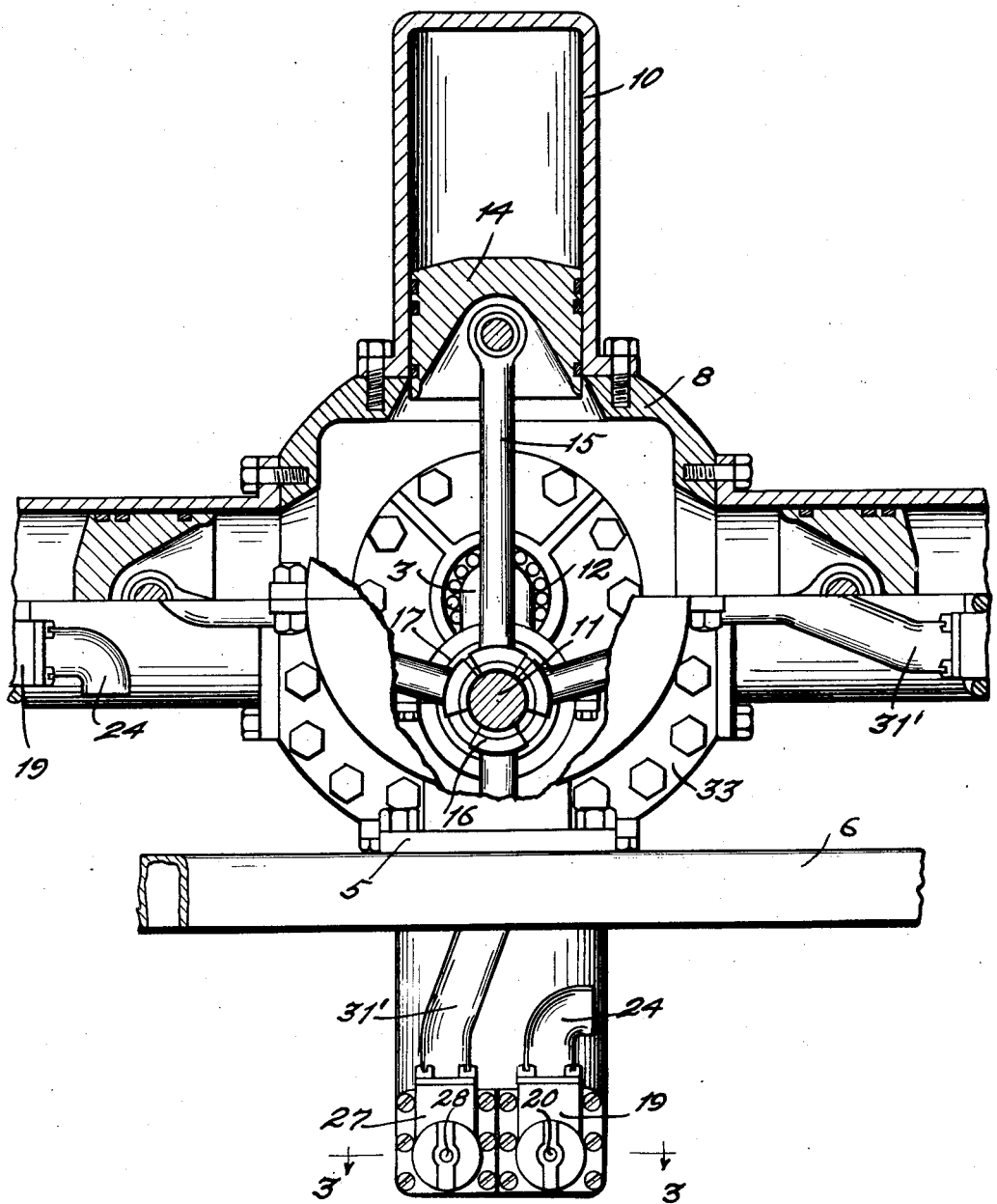

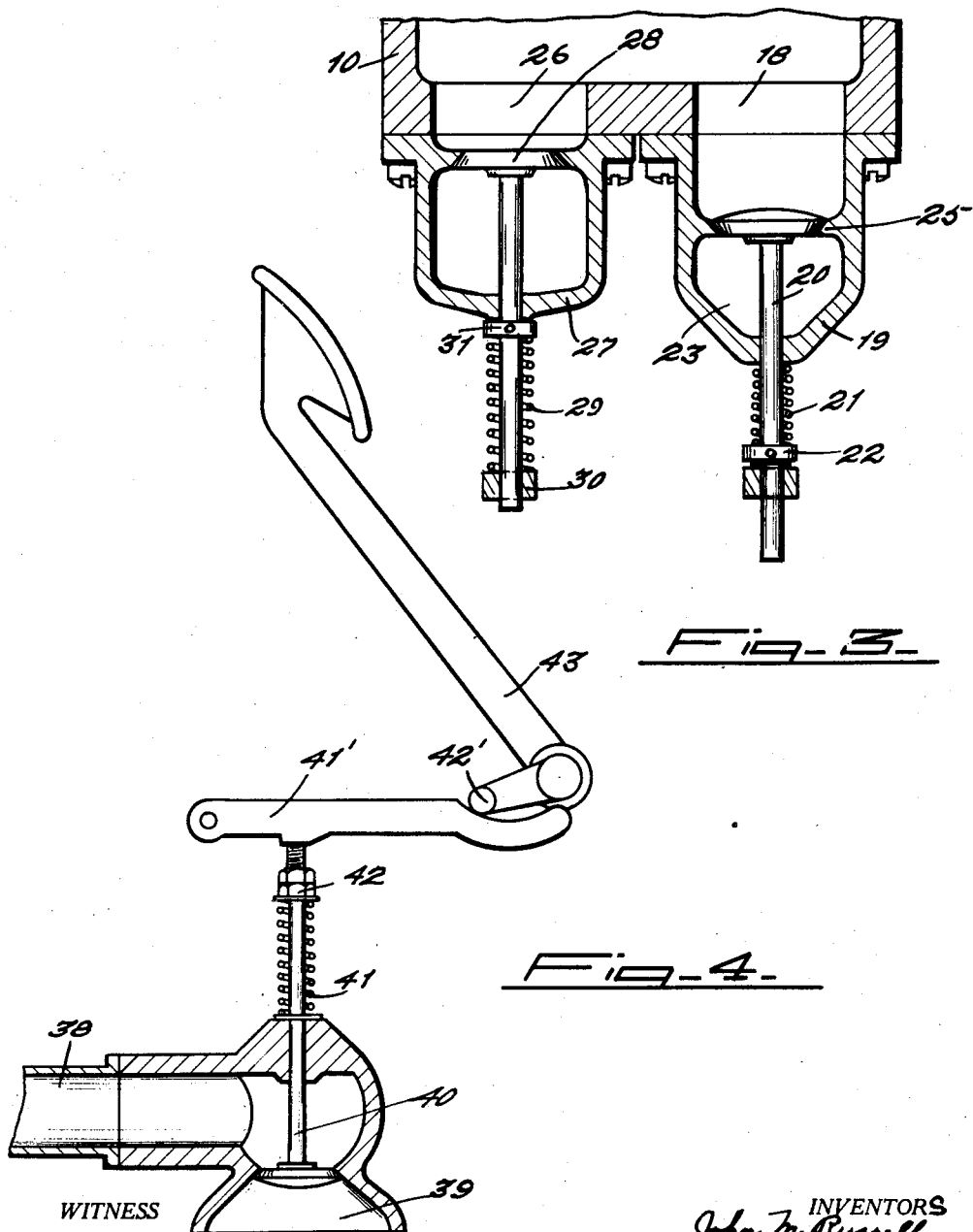

UNITED STATES PATENT OFFICE.

JOHN M. RUSSELL AND FREDERICK C. RUSSELL, OF SAN BRUNO, CALIFORNIA.

FLUID CLUTCH AND TRANSMISSION.

1,388,311. Specification of Letters Patent. Patented Aug. 23, 1921.

Application filed June 12, 1919. Serial No. 303,640.

*To all whom it may concern:*

Be it known that we, JOHN M. RUSSELL and FREDERICK C. RUSSELL, citizens of the United States, residing at San Bruno, in the county of San Mateo and State of California, have invented certain new and useful Improvements in Fluid Clutches and Transmissions, of which the following is a specification.

The present invention relates to what may be termed a fluid clutch adapted for interposition between a source of power and a driven member, whereby the driven member is capable of being operated at various speeds from zero up to that of the drive member without the employment of gear mechanism now universally in use.

The principal object of the present invention is to provide a device by means of which the speed and power of a driven member with respect to a driving member may be varied at will, either manually or automatically, and in which the entire mechanism is self contained. A further object of the invention is to provide a device which, when employed in connection with motor driven vehicles, serves the purpose of the motor fly wheel; one which is simple in construction; is composed of but few and readily manufactured parts, and which is capable of ready assembly and demounting when desired. A further object is to provide, in connection with a device of this type, an adjustable automatically operated relief member for relieving the fluid pressure therein when the same attains a predetermined pressure, thereby automatically relieving the strain on the motor and automatically reducing the driving speed ratio between the driving and driven members.

With the above mentioned and other objects in view, the invention consists in the novel construction and combination of parts hereinafter described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

To more fully comprehend the invention, reference is directed to the accompanying drawings, wherein—

Fig. 2 is a view in end elevation, partly in section, and with parts of the casing broken away.

Fig. 3 is a view in detail of the inlet and exhaust valves of one of the cylinders.

Fig. 4 is a sectional view of the manual and automatic pressure relief valve and its controlling mechanism.

Figure 1:
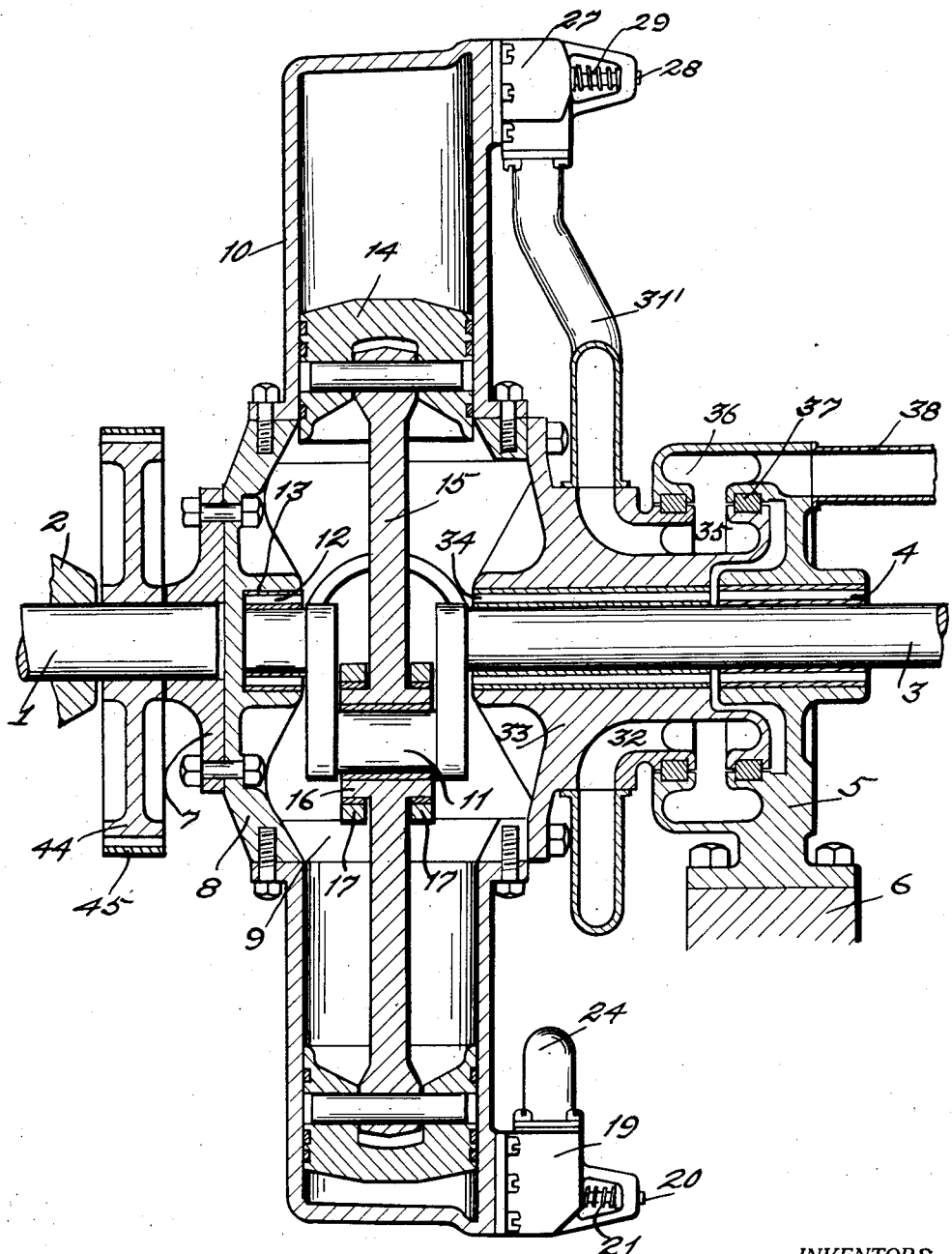
Figure 1 is a vertical sectional view of the preferred embodiment of our invention.

Referring more particularly to the drawings, wherein like characters of reference designate corresponding parts,—1 indicates a suitable power drive shaft mounted in a bearing 2 and driven from any suitable source of power, and 3 indicates a driven shaft disposed in alinement with said shaft 1 and rotatably mounted in a suitable anti-friction bearing 4 carried by a support 5 resting on a frame member 6. To the end of the shaft 1 is secured to rotate therewith a flanged collar 7 to which is bolted a cylinder supporting cage 8 provided in its peripheral wall with a plurality of openings 9 over each of which is detachably secured a cylinder 10 of any well known construction, the cylinders radiating from the cage 8 as in Figs. 1 and 2 of the drawings.

The inner end of the shaft 3 is provided with a crank 11 disposed within the cage 8 and the extreme inner end of said shaft is supported in a bearing 12 received in a depression 13 in the inner face of the end wall of said cage 8. Mounted to reciprocate within each of said cylinders 10, is a piston 14 of the well known type, connected through a connecting rod 15 with the crank 11. The inner ends of said connecting rods are formed with the laterally extending flanges 16 segmental in end elevation and provided with bearing surfaces to coöperate with the crank 11. The flanges when arranged about said crank 11, as in Figs. 1 and 2 of the drawings, are held thereon by the split rings 17 positioned one to overlie the flanges at either side of said connecting rods 15.

The outer end of each cylinder is provided with an air inlet port 18 over which is positioned a cage 19 mounting an inwardly opening suction operated valve 20, the stem of which is surrounded by a spring 21 positioned between the outer end of the cage and the collar 22 on said stem. From the chamber 23 of said cage extends an air inlet pipe 24, and said valve 20, when on its seat 25, interrupts the communication between said inlet port 24 and the interior of its associated cylinder. Each cylinder adjacent the opening 18 is provided with an exhaust port 26 over which is positioned a cage 27 in which is mounted a valve 28 normally seated by a spring 29 surrounding the stem of the valve and positioned between the cage frame 30 and a collar 31 on said stem, said valve being opened by the compression within its associated cylinder. From the respective cages 27 extend the exhaust outlet pipes 31′ which connect with the ducts 32 within a flanged plate 33 bolted to and closing the rear of the cylinder cage 8, and through a bore in which extends the shaft 3, said shaft being supported within said bore by suitable bearings 34.

The end of said flanged plate 33 is provided with an annular duct 35 into which said ducts 32 discharge, said duct 35 being open annularly of said plate 33 and registering with a corresponding annular duct or channel 36 formed in the member 5. The end of the member 33 provided with said duct 35 is received within the member 5, as in Fig. 1 of the drawings, and has a running fit therein, the escape of the air between the joint members of said member 33 and duct 36 being prevented by suitable packings 37.

From the duct or channel 36 extends a pipe or pressure relief 38, the discharge end 39 of which is normally closed by a pressure actuated outwardly opening valve 40 normally seated by a spring 41 the tension of which is regulated by the adjustable nuts 42.

Any suitable means may be provided for manually operating said valve 40, that form illustrated comprising a pivoted lever 41′ with the free end of which coöperates a crank 42′ associated with a pedal or other foot operated device 43.

The flanged member 7 is provided with a brake drum 44 with which coöperates a suitable brake band 45—Fig. 1 of the drawings.

The device being assembled as in the drawings, and the shaft 1 being rotated by its source of power, our preseent invention operates in the following manner.

The rotation of the shaft 1 in turn rotates the cage 8, cylinders 10, flanged member 33 in unison, and owing to the load placed on the shaft 3, the same is retarded, causing an operation of the pistons 14 within the cylinders 10 compressing the air within the cylinders, which is drawn therein through the ports 18 and discharged through the ports 26, both valve controlled. Thus the pressure of the air or rather the escape of the air from within the cylinders controls the relative speed between the shafts 1 and 3, and this escape is dependent on the operation of the valve 40. Should the nuts 42 associated with the valve 40 be so adjusted as to prevent the automatic opening of said valve 40 by the pressure in the pipe 38, the shafts 1 and 3 will rotate at the same speed until such time as the pedal 43 is depressed, relieving the pressure within the pipe 38. However, it is desired to automatically reduce the speed ratio between shafts 1 and 3 at such time as the load on shaft 1 becomes too great, and this is accomplished by the adjustment of the nuts 42.

It will be apparent in the present construction that any desired speed ratio may be obtained between the shafts 1 and 3 by simply operating the valve 40, and any automatic reduction may be obtained in accordance with the adjustment of the tension of the spring 41.

Under certain conditions it may be advisable to directly retard the speed of the shaft 1 with or without the employment of the compression within the cylinders, and this may be accomplished by tightening the band 45 around the drum 44.

By our present construction it will be apparent that the rotation of the cylinders 10 radiating from the shell 8 directly connected to the power shaft 1 provides a fly wheel for said shaft 1, and by the employment of said mechanism any desired speed ratio may be obtained between the drive and driven shafts.

Having thus described our invention, what we claim as new and desire to protect by Letters Patent is:—

A fluid clutch having a drive and a driven shaft arranged in axial alinement, a cylinder cage secured to said drive shaft and into which the end of said driven shaft extends and is rotatably mounted, a plurality of cylinders mounted on said cage and each provided with a valve controlled fluid inlet port and a valve controlled outlet port, said driven shaft formed within said cage with a crank portion, a piston within each of said cylinders and operatively connected with said crank, a bearing for supporting said driven shaft, a flanged plate secured to said cylinder cage and received within said bearing, said plate provided with a bore within which said driven shaft rotates, said bearing formed at its inner wall with an annular groove communicating with a port, said plate formed with a plurality of bores terminating in an annular peripheral channel communicating with the channel within said bearing, a pressure outlet pipe leading from the outlet port of each cylinder and communicating one with each of said bores, packing between coöperating surfaces of said plate and bearing, and a valve controlling the outlet from said bearing port.

In testimony whereof we have signed our names to this specification in the presence of two subscribing witnesses.

JOHN M. RUSSELL.
FREDERICK C. RUSSELL.

Witnesses:
HARRY H. TOTTEN,
D. B. RICHARDS.